United States Patent [19]
Ryder et al.

[11] 3,945,717
[45] Mar. 23, 1976

[54] ILLUMINATING MAGNIFYING LENS STRUCTURE

[75] Inventors: Francis E. Ryder, Barrington; Theodore H. Mueller, Cary, both of Ill.

[73] Assignee: Ryder International Corporation, Barrington, Ill.

[22] Filed: Oct. 10, 1974

[21] Appl. No.: 513,730

[52] U.S. Cl. ............. 350/237; 240/10.69; 350/236
[51] Int. Cl.² ........................................ G02B 25/02
[58] Field of Search ..... 350/235, 237, 236, 175 LD; 240/2 M, 10.5, 10.69

[56] References Cited
UNITED STATES PATENTS

| | | | |
|---|---|---|---|
| 2,282,167 | 5/1942 | Cullman | 240/10.69 |
| 2,316,301 | 4/1943 | Ullman | 350/237 |
| 2,586,723 | 2/1952 | Sakols | 350/237 |
| 2,787,937 | 4/1957 | Prisament | 350/237 |

FOREIGN PATENTS OR APPLICATIONS
995,566   6/1965   United Kingdom ................ 350/235

Primary Examiner—Archie R. Borchelt
Assistant Examiner—E. R. LaRoche
Attorney, Agent, or Firm—Olson, Trexler, Wolters, Bushnell & Fosse, Ltd.

[57] ABSTRACT

The embodiment of the invention disclosed herein is directed to a magnifying lens structure adapted to receive a light from within a housing and transmit the light toward an object point of the lens to illuminate the area thereabout. The lens structure has two parallel strips of refractive surfaces on opposite sides of a magnifying lens. The light is transmitted into the transparent lens material and therethrough to the strips of refractive surfaces whereupon the light is directed to the area which surrounds the object point for better viewing of the area.

6 Claims, 4 Drawing Figures

ILLUMINATING MAGNIFYING LENS STRUCTURE

BACKGROUND OF THE INVENTION

The embodiment of the invention disclosed herein is directed to a magnifying structure, and more particularly to an illuminating magnifying lens structure which insures the illumination is directed to the object viewed.

Illuminating magnifying lens devices, generally are well known. These devices normally are comprised of a magnifying lens, held in place by a handle, with a small light bulb and power supply mounted within said handle. Illumination of the viewing area is achieved by orienting or aiming the bulb at the approximate focal point.

These prior art devices are normally of rather inexpensive construction, and a problem arises is the positioning or orientation of the bulb, which may become misaligned during assembly, handling, or subsequent use. The end result being that the desired view area is often not properly illuminated.

The present invention overcomes this problem by providing an arrangement wherein the construction of the magnifying lens structure functions as a receiver and emitter of the light energy, such that the geometry, thereof will insure illumination of the viewing area at all times.

SUMMARY OF THE INVENTION

Accordingly, it is an object of this invention to provide a new and improved magnifying lens structure which incorporates the entire light source within a support handle of the magnifying lens.

Another object of this invention is to provide a new and improved magnifying lens structure wherein the light energy directed toward the object point beneath the magnifying lens is directed thereto by refractive surfaces formed integral with the magnifying lens.

Still another object of this invention is to provide a new and improved magnifying lens structure which substantially increases the viewing area around the object point of the magnifying lens so that more subject matter can be viewed.

Yet another object of this invention is to provide a novel magnifying lens configuration which has light-receiving means and light-transmitting means integral therewith so that light from the light source can be directed toward an object point of the lens for viewing of subject matter whether there is little or no ambient light available.

Briefly, the magnifying lens element of this invention has a light-receiving portion adapted to be inserted into a handle. The light-receiving portion is placed immediately adjacent a light source and has suitable reflective means about the light source and the light-receiving portion to insure that substantially all of the light from the light source enters the magnifying lens element. The light energy within the magnifying lens element passes through refractive portions. These refractive portions are so positioned and angled that they direct the light energy to the object point of the magnifying lens so that the area about the object point is illuminated. The lens structure is trapezoidal in configuration and provides a longitudinal object point to increase the area of view of subject matter located at the the object point.

Many other objects, features and advantages of this invention will be more fully realized and understood from the following detailed description when taken in conjunction with the accompanying drawings wherein like reference numerals throughout the various views of the drawings are intended to designate similar elements or components.

DETAILED DESCRIPTION OF THE ILLUSTRATED EMBODIMENT

Figure 1:
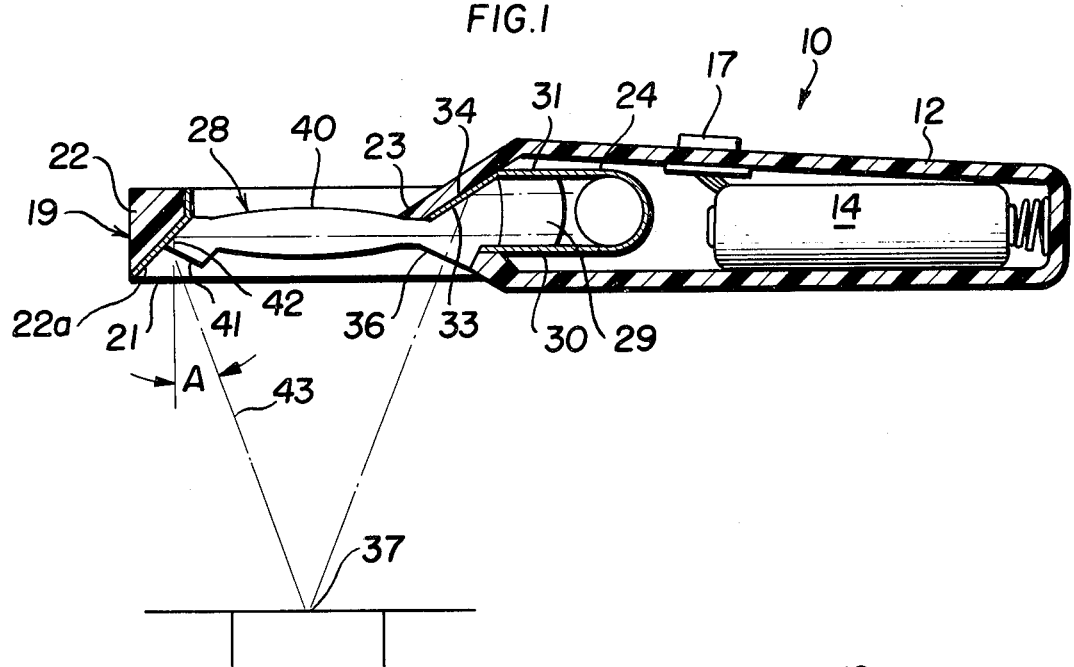
FIG. 1 is a side sectional view of a magnifying lens structure constructed in accordance with the principles of this invention.

Referring now to FIG. 1, there is seen a magnifying lens structure constructed in accordance with the principles of this invention and designated generally by reference numeral 10. The magnifying lens structure 10 includes a housing 12 for containing a light bulb 13 and an energizing battery source 14. The battery source 14 may include one, two or more battery cells, as desired. The light bulb 13 is mounted within a socket 16, FIG. 2, and electrically connected to the battery 14 through an on-off switch 17 and suitable electrical leads as indicated by reference numeral 25. The electrical connection between the light bulb and the battery 14 is of conventional configuration and forms no part of this invention. The electrical connection may be formed by insulated wires between the various poles of the battery or may be formed by a conductive strip secured to the switch 17 and adapted to engage the bulb holder 16 in a manner well-known in the art to energize the light bulb.

The housing 12 includes a lens support portion 19 extending therefrom and provides a magnifying lens viewing area. In the illustrated embodiment the magnifying lens viewing area is substantially polygonal in configuration, here being illustrated as trapezoidal but somewhat rectangular. However, it will be understood that other polygonal, round or elliptical configurations can be incorporated without departing from the novel concepts of this invention.

Figure 2:
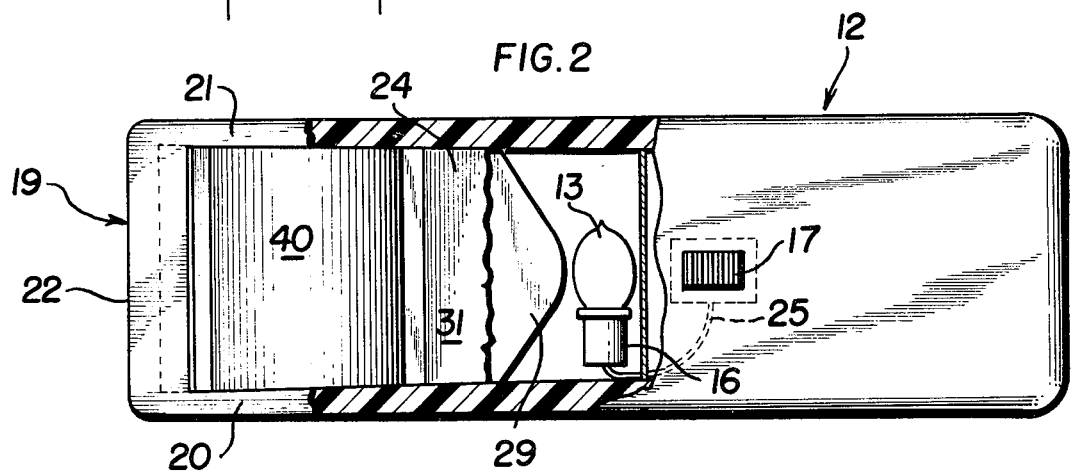
FIG. 2 is a plan view of the magnifying lens element and associated light source and illustrates the reflective shield joining the light-receiving portion of the lens element and the light source associated therewith.

The lens support portion 19 includes spaced apart side portions 20 and 21 diverging outwardly from the housing 12 and terminating at an end portion 22. The end portion 22 is substantially parallel to the terminating end 23 of the housing 12. The lower portion of the end portion 22 is provided with reflective member 22a, such as reflective paint or a strip of reflective metal. A reflective member 24 is positioned within the housing 12 and is adapted to surround the light bulb 13. This insures that substantially all of the light from the bulb wil be directed in a given direction toward a lens element 28. Most advantageously, the lens element 28 is secured between the housing 12 and the lens support 19 to provide the substantially trapezoidal or somewhat rectangular viewing area, as best seen in FIG. 2.

The lens element 28 includes a light-receiving portion 29 formed integrally therewith and adapted to be positioned within the housing 12 and located immediately adjacent the light bulb 13. The light-receiving portion 29 is confined between spaced apart wall portions 30 and 31 of the reflective element 24. Furthermore, the light-receiving portion 29 has an angled surface portion 33 which engages a downwardly angled reflective portion 34 of the reflector 24. Substantially all of the light produced by the light bulb 13 is therefore delivered to the interior of the magnifying lens element 28 and maintained therein by the reflective element 24.

Immediately adjacent the light-receiving portion 29 of the light element 28 is a refractive portion 36 through which lens energy passes and is directed toward an object point 37 located a predetermined distance beneath a lens viewing area 40. In the illustrated embodiment the object point is longitudinal along the transverse extent of the magnifying lens element and provides viewing of subject matter over a large area.

The lens element 28 has a second refractive portion 41 positioned adjacent the terminating end 22 of the support 19. The refractive portion 41 may have the same or different index of refraction than that of the refractive portion 36. This is illustrated by the angle of refraction A between a line extended perpendicular to direction of the light beam 42, as it is reflected off of the surface 22a, and the path of travel of the light beam toward the object point 37 as indicated by the line 43. Since the light beam 42 strikes the surface 41 at an angle it will be further bent in accordance with the index of refraction at the surface 41.

Figure 3:
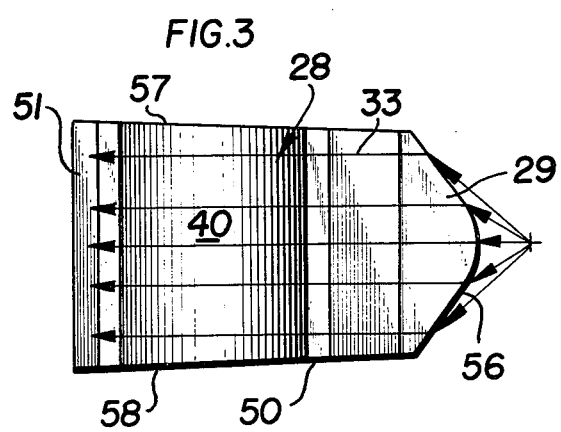
FIG. 3 is a plan view of the magnifying lens element constructed in accordance with this invention.
Figure 4:
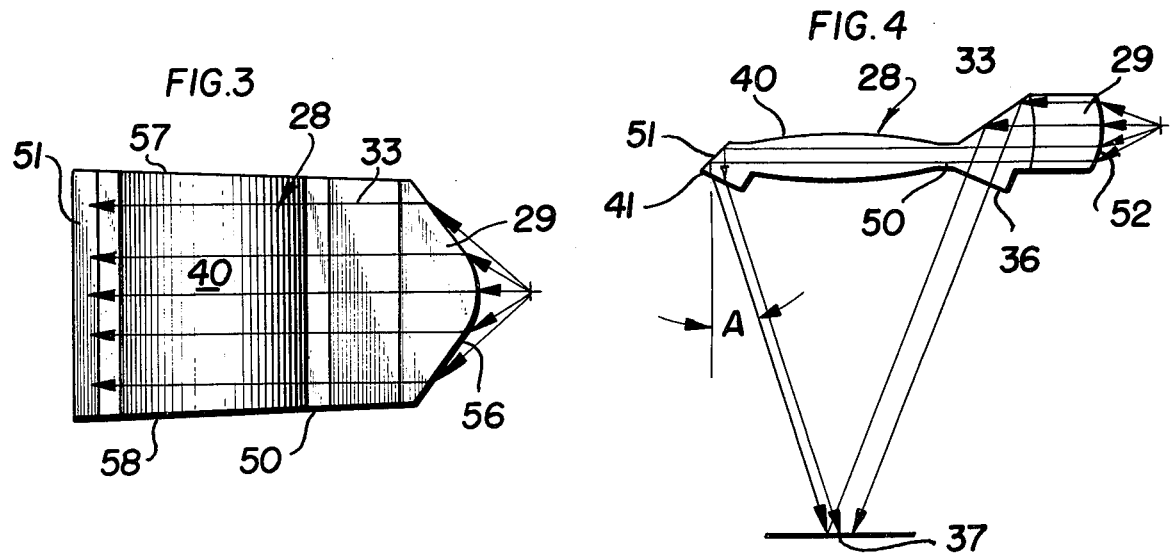
FIG. 4 is a side view of the magnifying lens element of FIG. 3.

Referring now to FIGS. 3 and 4, the details of construction of the magnifying lens element are illustrated. The magnifying lens element 28 has the slanted light reflective portion 33 angled to cause light rays entering the light-receiving portion 29 to be directed substantially perpendicularly to the refractive portion 36. This eliminates the angle of refraction that will occur as a result of nonperpendicular light rays passing therethrough.

The magnifying lens element 28 has a reduced cross-sectional area 50 immediately adjacent the light-reflective portion 33 and the light-refractive portion 36. The reduced area 50 is substantially in alignment with a light reflective portion 51 located at the other end of the magnifying lens element. The angle of the light-reflective portion 51 is such that the light rays directed toward the light-refractive surface 41 will have a refractive angle of penetration as indicated by the angle A. Angle A is selected so that the light rays impinge substantially upon the object point 37 to completely illuminate the area defined thereby.

The terminating end of the light-receiving portion 29 is convex in configuration, as indicated by reference numeral 52 and is so configurated to cause substantially all of the light rays entering the light-receiving portion to be substantially parallel. The portion of the light rays above the reduced diameter portion 50 impinge upon the surface 33 and are reflected therefrom through the refractive surface 36. However, the light rays in alignment with the reduced dimension portion 50 pass through the viewing portion 40 of the lens 28 and impinge upon the reflective surface 51 and through the refractive surface 41 as mentioned above.

As best seen in FIG. 3, the plan view of the magnifying lens element illustrates that the light-receiving portion 29 has a substantially parabolic wall surface as indicated by reference numeral 56. This configuration is also adapted to cause light rays entering the light-receiving portion to be substantially parallel to the magnifying lens element. As also seen in FIG. 3, sidewall portions 57 and 58 are diverging from the light-receiving portion 29 toward the opposite end thereof. The plan view of the magnifying lens element 28 is trapezoidal in configuration.

What has been described is a simple and efficient magnifying lens structure which enables light to be directed more accurately to an area about an object point of the magnifying lens for more fully illuminating the area. Accordingly, it will be understood that variations and modifications may be effected without departing from the spirit and scope of the novel concepts disclosed and claimed herein.

The invention is claimed as follows:

1. In an illuminated magnifying lens structure, the combination comprising: a housing, a light source secured within said housing and adapted to be selectively energized and de-energized, a magnifying lens element secured to said housing, said magnifying lens element having a predetermined focal length to magnify objects at an object point of predetermined distance from said lens, the improvement wherein said magnifying lens structure includes a central magnifying portion, and integrally formed prismatic end portions on opposite sides of said magnifying portion, a first one of said prismatic end portions being disposed adjacent said light source and including a light receiving section to gather light energy for transmission through said lens, said first prismatic portion further including an inclined reflective surface and a refractive surface disposed opposite said reflective surface, said refractive surface being angled to focus light energy on said object point, and said other second prismatic portion being disposed on the opposite side of said central magnifying portion and including a reflective surface and a refractive surface for diverting and focussing on said object point the light initially passing through said magnifying portion, whereby a substantial amount of the light energy emitted by said light source is focussed on said object point.

2. The combination as defined in claim 1 wherein said housing includes reflector means overlying said reflective surfaces to further concentrate said light energy toward the opposed refractive surface for focussing on said object point.

3. In the magnifying structure as set forth in claim 1 wherein said light-gathering portion of said first prismatic portion is parabolic in the configuration when viewed in the plane of said magnifying lens element.

4. An integral lens structure for use in an illuminating magnifying reading glass, of the type including a holder for the lens and a selectively energizable light source for illuminating said lens, the lens structure comprising, a central magnifying lens portion having a focal length to magnify objects at a predetermined distance from said lens, first and second prismatic end portions disposed on opposite sides of said magnifying lens portion, said first prismatic portion including a light receiving section for disposition adjacent a light source to gather light rays for transmission longitudinally through said lens structure, said first prismatic portion further including an inclined reflective surface and an oppositely inclined refractive surface disposed in opposition to said reflective surface, said refractive surface being angled to focus light rays on the object point of said central magnifying lens portion, and said second prismatic portion including a reflective surface and a refractive surface for diverting and focussing on said object point, the light rays initially passing through said magnifying lens portion.

5. An integral lens structure as defined in claim 4, wherein said light receiving portion is parabolic in configuration, when viewed in the plane of said magnifying lens surface.

6. An integral lens structure as defined in claim 4, wherein said first prismatic portion is of a cross-sectional width greater than that of said magnifying lens portion and has the axis thereof offset with respect to the axis of said lens portion whereby a major portion of the light gathered will be focussed on said object point, with a minor portion of said light energy passing through said magnifying lens portion for illuminating of same and for subsequent focussing on said object point by said second prismatic end portion.

* * * * *

UNITED STATES PATENT OFFICE
CERTIFICATE OF CORRECTION

Patent No. 3,945,717            Dated March 23, 1976

Inventor(s) FRANCIS E. RYDER and THEODORE H. MUELLER

It is certified that error appears in the above-identified patent and that said Letters Patent are hereby corrected as shown below:

Column 4, line 52, "illuminat_ing_" should be --illuminated--

Signed and Sealed this fifteenth Day of June 1976

[SEAL]

Attest:

RUTH C. MASON
*Attesting Officer*

C. MARSHALL DANN
*Commissioner of Patents and Trademarks*